No. 730,468. PATENTED JUNE 9, 1903.
T. B. MILLS.
PHOTOGRAPHIC CAMERA.
APPLICATION FILED JAN. 12, 1901.
NO MODEL. 4 SHEETS—SHEET 1.
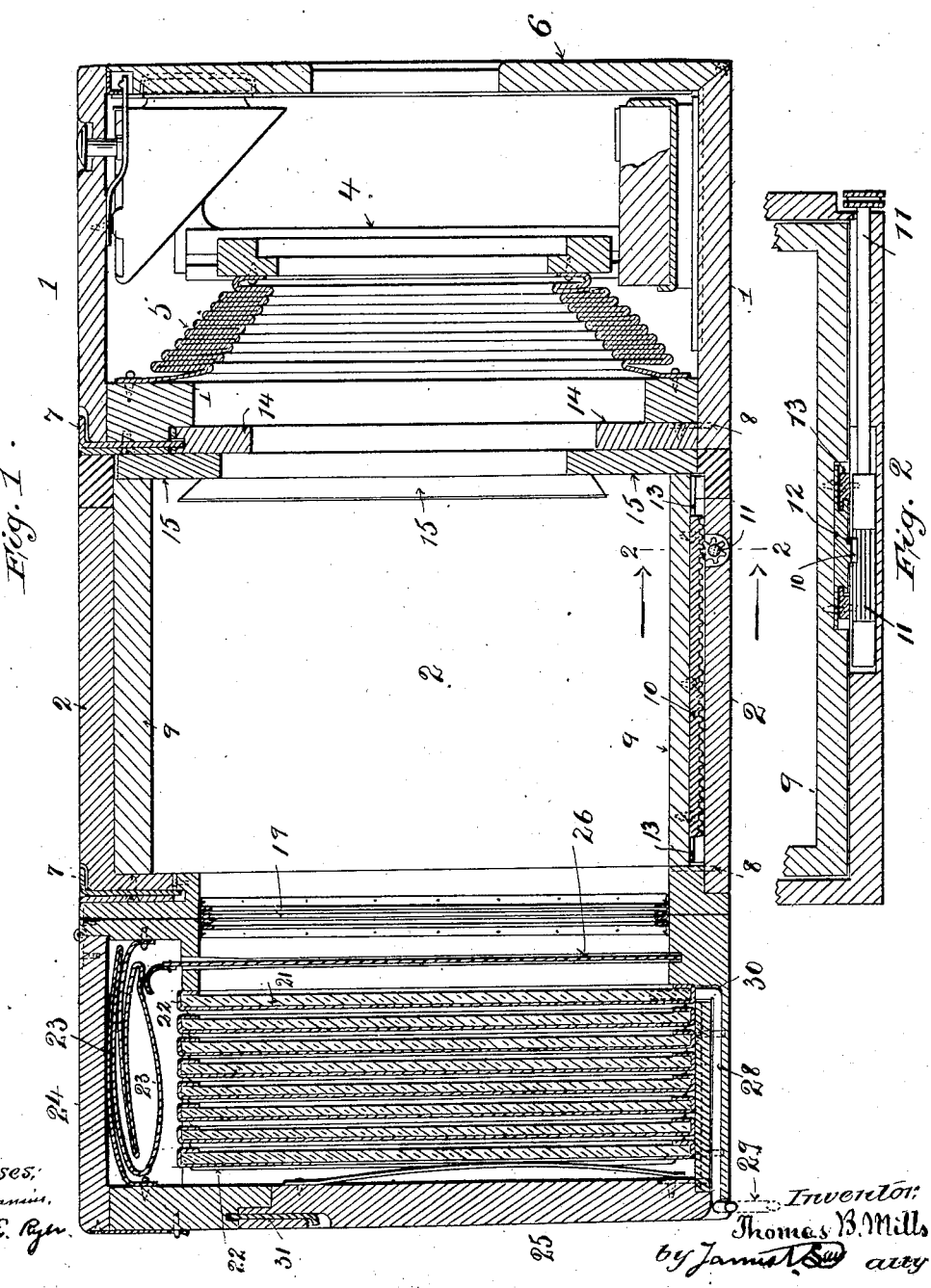

No. 730,468. PATENTED JUNE 9, 1903.
T. B. MILLS.
PHOTOGRAPHIC CAMERA.
APPLICATION FILED JAN. 12, 1901.
NO MODEL. 4 SHEETS—SHEET 2.
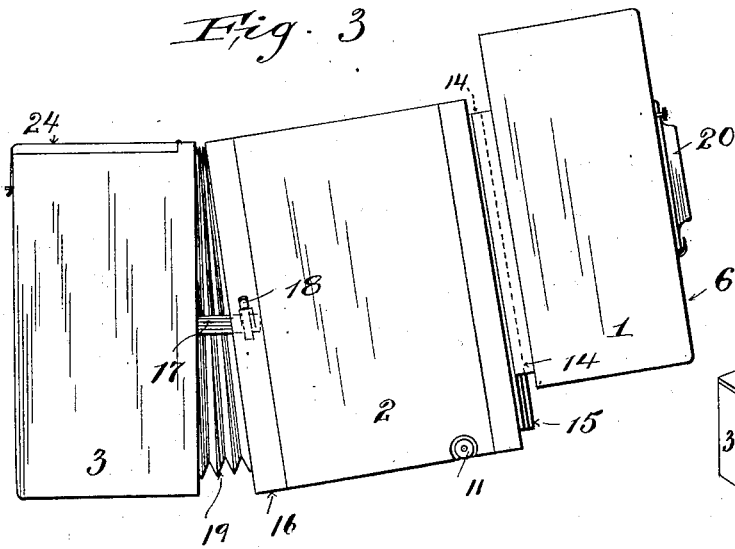
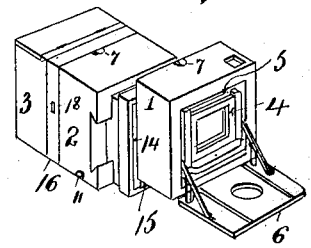
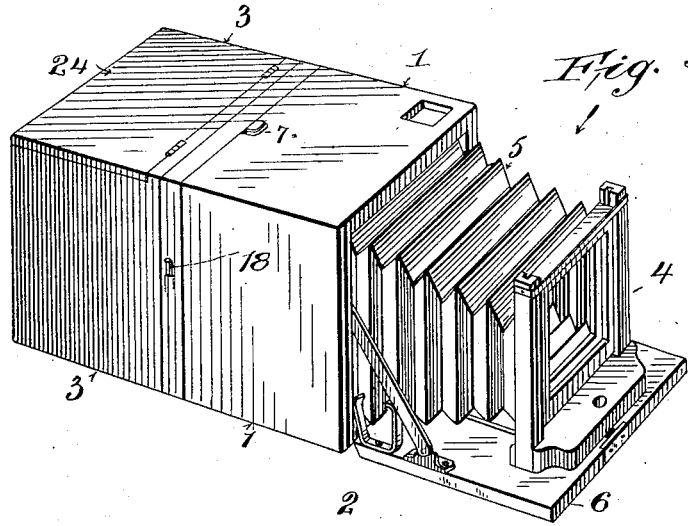
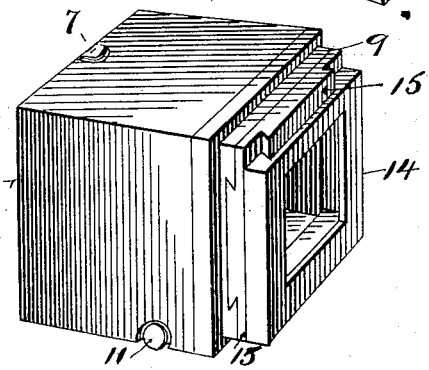
Witnesses:
C. W. Benjamin
Louis E. Ryer
Inventor:
Thomas B. Mills
by James ...
atty No. 730,468. PATENTED JUNE 9, 1903.
T. B. MILLS.
PHOTOGRAPHIC CAMERA.
APPLICATION FILED JAN. 12, 1901.
NO MODEL. 4 SHEETS—SHEET 3.
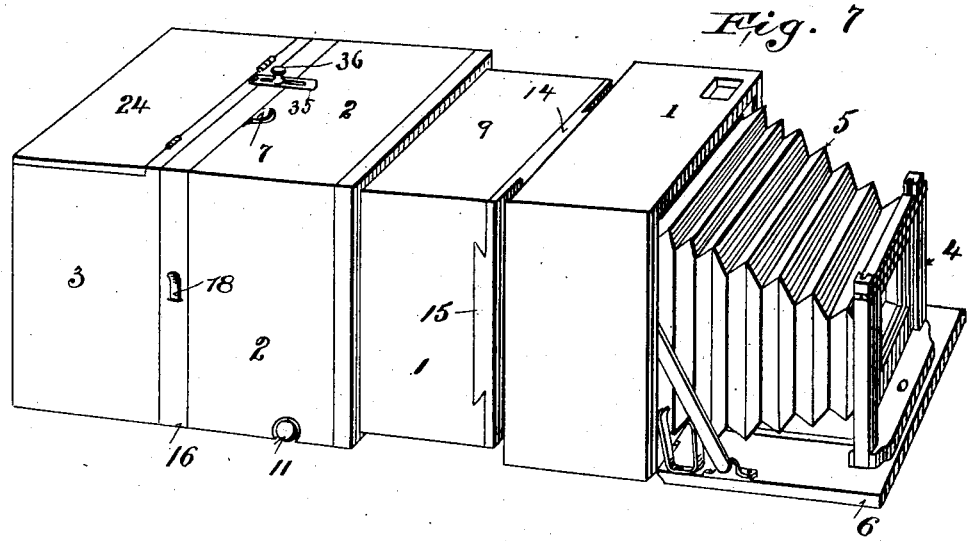
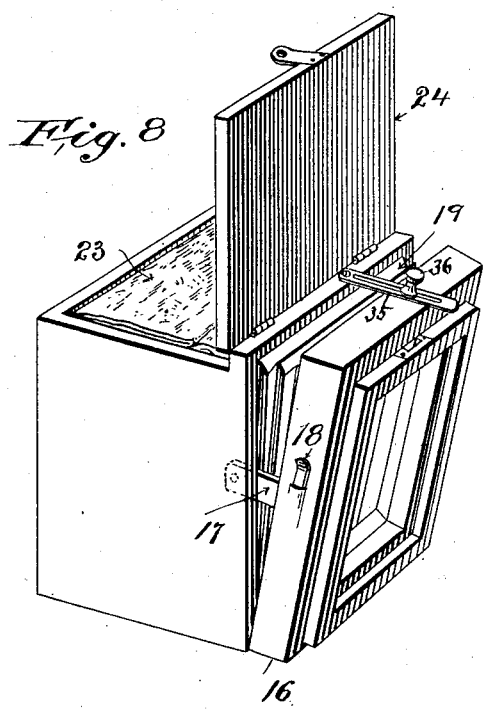
Witnesses:
C. W. Benjamin
Louise E. Ryer
Inventor,
Thomas B. Mills
by James Dow
atty

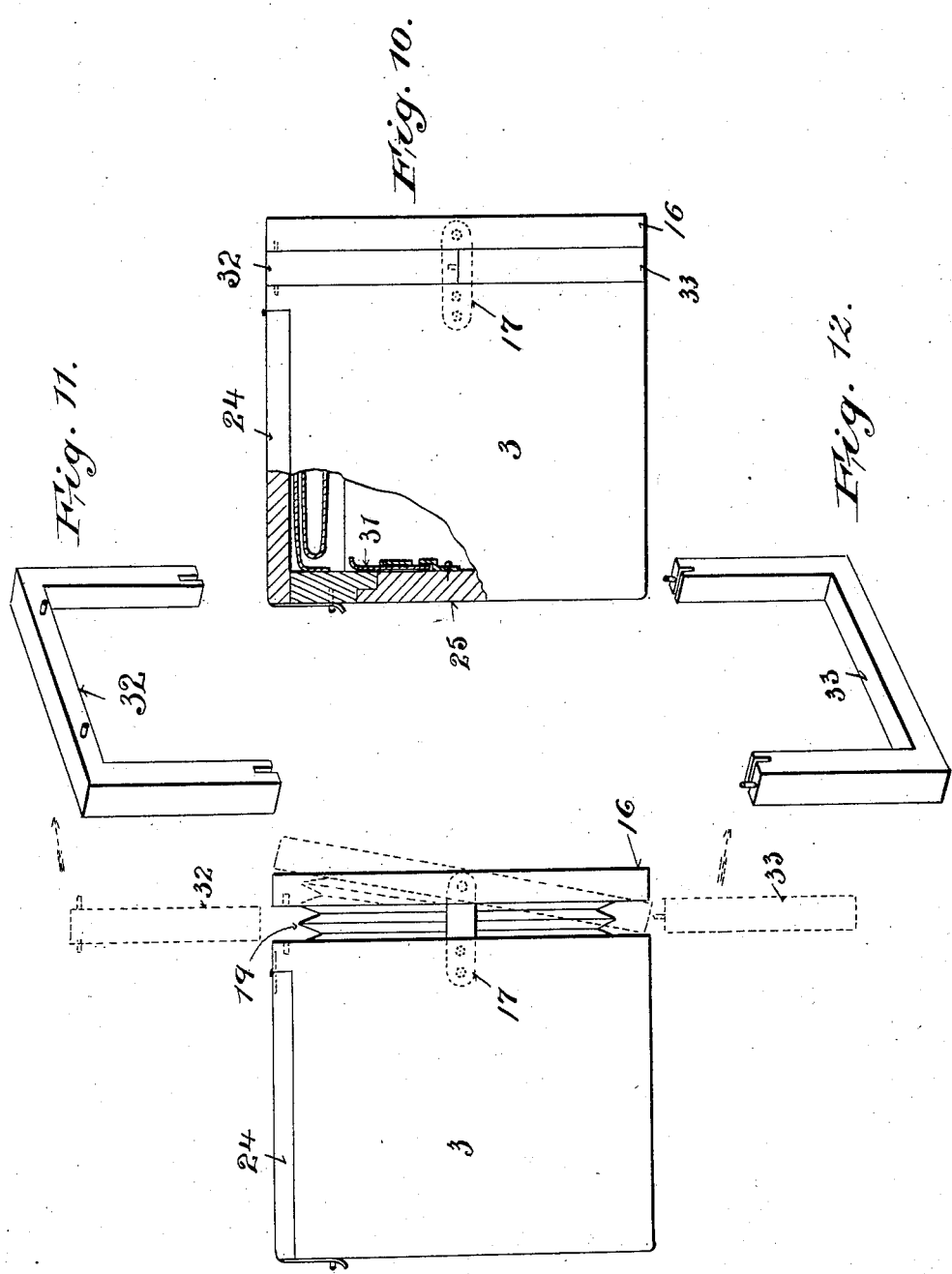

No. 730,468. Patented June 9, 1903.

UNITED STATES PATENT OFFICE.

THOMAS B. MILLS, OF BROOKLYN, NEW YORK.

PHOTOGRAPHIC CAMERA.

SPECIFICATION forming part of Letters Patent No. 730,468, dated June 9, 1903.

Application filed January 12, 1901. Serial No. 42,955. (No model.)

*To all whom it may concern:*

Be it known that I, THOMAS B. MILLS, a citizen of the United States of America, and a resident of the borough of Brooklyn, city of New York, State of New York, have invented certain new and useful Improvements in Photographic Cameras, of which the following is a specification.

This invention relates to hand-cameras; and it consists, among other features, in a novel construction of the camera by which it can be converted, as may be desired, into a box or a folding form of camera, as set forth in the constructions and combinations contained in the claims herewith.

In the accompanying drawings, illustrating this invention, Figure 1 is a longitudinal section of the box-magazine camera containing my improvements. Fig. 2 is a vertical cross-section of the bottom of the camera through the lines 2 2, Fig. 1. Fig. 3 is a side view of the box-camera, showing the rising front and swing-back on the magazine. Fig. 4 is a view of the box-camera on a reduced scale, showing the reversible rising front. Fig. 5 is a view of the folding camera constructed according to my improvement. Fig. 6 is a detached extension-section of the box-camera, showing the construction of the reversible rising front. Fig. 7 is a view of the box-camera extended to produce a long-focus camera. Fig. 8 is a view of the detachable magazine, and Figs. 9 to 12 are views of a modified construction of the swing-back of the magazine or holder.

By the term "holder" or "magazine" as used in the description and claims herein I mean a receptacle or holder of any form or construction for one or for a number of plates or for a roll of films.

It is frequently desirable to change a camera from a box to a folding form or the reverse to adapt it to different purposes and work. With the camera here described this change can readily be accomplished while the camera is in use and without effecting the unexposed plates and films.

This improved camera is composed or constructed of detachable parts or sections comprising different portions of the camera, which by being removed from or connected to each other form the camera into a box or a folding camera.

In Figs. 1, 3, and 4 the camera is shown in its box form of construction and as composed of the detachable lens-section 1, extension-section 2, and magazine or holder section 3. The "lens-section," as its name implies, contains the lens and shutter (not shown) mounted in the usual lens-frame 4, to which is connected the bellows 5, enabling the lens to be drawn out in focusing when the camera is used as a folding camera, as described below. The front 6 of the sections drop down in the usual manner when necessary to form the bed on which the lens-frame slides. This lens-section is attached to the front of the extension-section 2 by the catches 7 and 8, so as to be readily secured to or removed therefrom. The extension-section consists, essentially, of two frames or boxes open at their ends and arranged to slide the one within the other, by which the section is extended or contracted in the usual manner and the lens-section moved away from or toward the plates or films in focusing the lens. In the construction shown in the drawings the sliding of the inner frame 9 is effected by the rack-and-pinion mechanism 10, operated by the rod 11, Fig. 2. As will be seen from this figure, the plate 12 on the bottom of the inner frame 9 engages with the plate 13 on the outer frame, whereby the bottoms of the two frames are held close to each other and the inner frame caused to slide smoothly and easily and all binding of the frames, especially at the top, as they move, is prevented. To the back of the extension-section 2 is attached the holder or magazine section 3 by the catches 7 and 8, so as to be readily secured to or removed from the camera. The drawings show this section 3 as a magazine for a number of plates; but the section may be a double plate-holder for two plates or a roll-holder for films, as is desired.

In the box-camera shown in the drawings the front of the camera is provided with a reversible sliding mechanism by which the lens-section can be raised or lowered in either the vertical or horizontal position of the plate. This reversible rising mechanism is situated on the front end of the extension-section 2 and in the particular construction shown consists of the dovetail frames 14 and 15, sliding in directions at right angles with each other, the frame 14 being arranged to slide in one direction on the frame 15 and the latter to slide on the box or section 3 in a direction at right angles to that of the frame 14, whereby the lens-section 1, which is attached to the frame 14, can be raised in either position of the camera for a vertical or horizontal plate, as shown in Figs. 3 and 4.

The camera illustrated in the drawings is provided with a swing-back, which is attached to and forms part of the detachable holder-section 3. This swing-back mechanism, as shown more particularly in Fig. 8, consists of the frame 16, secured to the end of the holder 3 by the metal strip 17, on which it can slide to and from the latter and can swing or incline in either position of the camera in the usual manner. Connecting the holder and frame 16 is a bellows 19 or similar device to exclude the light from the interior of the camera. A catch 18 on the frame 16, engaging with the metal strip 17, secures the frame to the holder when the swing mechanism is not used, and a set-screw 36, engaging with the slotted plate 35, secures the frame at any inclination desired. The frame 16 is attached to the camera and permits the latter to be inclined in any direction while the holder 3 remains in a vertical position.

The camera thus described is the usual box-camera, in which the focusing of the lens is accomplished by the telescopic or sliding sections of the extension-section of the camera and in which the lens works through the hole or opening in the front 6 of the camera. (Shown in Figs. 1 and 4.) The shutter is operated from the outside in any of the well-known methods used with such box form of cameras.

To change the box-camera above described to a folding form of camera, it is only necessary to detach and remove the extension-section 2 from the lens and the holder-sections and connect the two latter sections together by the catches 7 and 8, as is shown in Fig. 5. The camera is now a complete folding camera, and the focusing of the lens is accomplished by the bellows and the sliding lens-frame in the lens-section in the usual manner, the front 6 being turned down to form the bed on which the lens-frame slides, and the rising and falling front is on the lens-frame. This folding camera may be changed back to the box form by detaching the lens-section from the holder-section and inserting and securing the extension-section between the two. These changes in no way affect either the lens-section or the holder or magazine with its plates or films and may be readily performed in the bright light.

By the use of the bellows and sliding lens-frame in the lens-section in connection with the extension-section it is possible in this improved construction of box-camera to obtain a long extension of the camera, as shown in Fig. 7, and then be enabled to use a long-focus lens with a small compact box-camera.

The particular holder-section 3 shown in the drawings is the improved construction of plate-magazine described in an application for magazines for cameras filed by me August 9, 1901, Serial No. 71,459, and consists of a magazine for a series of plates 21, contained in metal septums 22, which are shifted so as to be successively exposed through a flexible light-excluding hood 23 at the top of the magazine-box. The plates are inserted into and removed from the magazine through the removable back 25, held in place by the catch 31. To render the magazine light-proof when detached from the camera, a dark slide 26, operated through the hood, is placed in front of the plates and is withdrawn and slid down at the back of the series of plates when the latter are to be exposed.

The successive plates are raised, so they can be grasped and shifted through the hood by the rod 28 at the bottom of the negative-box, whose ends 29 and 30 are bent at right angles to each other. As the outer end 29 of the rod is turned down the inner end 30 is raised, thus lifting the plate.

Any other form or construction of magazine or plate or roll holder may be used with the camera here shown and provided with or used without a swing-back mechanism, as desired.

As will be seen from the drawings, all the sections of the camera, and particularly the magazine or holder section, are flush with each other, and there are no protuberances or projections on the magazine, the top and bottom and sides being flush and in line with the rest of the camera. When used as a box-camera, if desired, a shutter 20 may be placed on the front 6 of the lens-section. This shutter 20 would thus be secured in the lid forming the bed on which the lens-frame 4 slides.

In Figs. 9 to 12 is shown an attachment for the swing-back mechanism by the use of which the necessity of refocusing when the swing-back is used is obviated. In this construction the frame 16, and consequently the camera and lens, is at all times held out at a fixed distance from the plate or film, and it is not necessary to draw the plate or film holder away from the lens when the swing-back is to be used. The attachment consists of two detachable frames 32 and 33, fitting between the frame 16 and the end of the holder 3, holding the magazine or holder fixed and in line with the frame, and thus with the camera. To use the swing-back the frames 32 and 33 are removed, when the frame 16 can be inclined, as desired.

I do not wish to confine myself to the particular form and construction of the several parts of the camera here shown, as it will be evident that the construction may be varied without departing from the spirit of my invention.

What I claim is—

1. In a photographic camera, the combination with a folding camera, consisting of a lens-section having a sliding lens-frame, and a holder-section for the sensitized surfaces detachably connected to one another; of an extension-section arranged to be removably secured to the camera between the lens-section and holder-section, substantially as and for the purpose set forth.

2. In a photographic camera, in combination, the lens-section having a sliding lens-frame; extension-section; and holder-section, for the sensitized surfaces; detachably connected to one another, substantially as and for the purpose set forth.

3. In a photographic camera, in combination, the lens-section 1, having the sliding lens and shutter frame 4 and bellows 5; extension-section 2, provided with means whereby the front of the camera may be raised in either direction; and holder 3; detachably connected to one another, whereby the character of the camera may be varied, substantially as and for the purpose set forth.

4. In a photographic camera, in combination, the lens-section 1, having the sliding lens and shutter frame 4 and bellows 5; extension-section 2, provided with means whereby the front of the camera may be raised in either direction; and holder 3, having a swing-back mechanism; detachably connected to one another, whereby the character of the camera may be varied, substantially as and for the purpose set forth.

5. In a swing-back mechanism for cameras, the detachable frames 32 and 33 arranged to slide between the swing-frame and negative-holder, as and for the purpose set forth.

6. In a photographic camera-box, the combination with the front of the camera, forming the bed for the sliding lens, of a shutter inserted in the front, substantially as directed.

Signed by me at the city of New York this 11th day of January, 1901.

THOMAS B. MILLS.

Witnesses:
   DAVID M. WOLFF,
   LOUISE E. RYER.